US012783292B2

(12) United States Patent
Venkatanarayanan et al.

(10) Patent No.: US 12,783,292 B2
(45) Date of Patent: Nov. 3, 2026

(54) AUTOMATED KUBERNETES MIGRATION ORCHESTRATION

(71) Applicant: Dell Products, L.P., Hopkinton, MA (US)

(72) Inventors: Prakash Venkatanarayanan, Framingham, MA (US); Thomas Watson, Richardson, TX (US); Pooja Prasannakumar, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 403 days.

(21) Appl. No.: 18/609,458

(22) Filed: Mar. 19, 2024

(65) Prior Publication Data

US 2025/0298656 A1 Sep. 25, 2025

(51) Int. Cl.
*G06F 9/48* (2006.01)

(52) U.S. Cl.
CPC .................................. *G06F 9/4856* (2013.01)

(58) Field of Classification Search
CPC ............................. G06F 9/4856; G06F 9/5088
USPC ......................................................... 718/105
See application file for complete search history.

(56) References Cited

U.S. PATENT DOCUMENTS

2021/0132812 A1* 5/2021 Srinivasan ............ G06F 3/0659
2022/0027051 A1* 1/2022 Kant ..................... G06F 3/0617
2022/0092024 A1* 3/2022 Kavaipatti Anantharamakrishnan ................ G06F 16/182
2022/0129313 A1* 4/2022 Birsan ..................... H04L 67/10
2022/0206900 A1* 6/2022 Zad Tootaghaj ...... G06F 9/5077
2022/0334725 A1* 10/2022 Mertes .................. G06F 3/0605
2022/0334775 A1* 10/2022 Stotski .................. G06F 3/0644
2022/0337417 A1* 10/2022 Sanders .................. H04L 67/34
2023/0105744 A1* 4/2023 Lin ....................... H04L 45/745 370/392
2023/0195535 A1* 6/2023 Pabón ..................... G06F 9/455 718/104
2023/0195539 A1* 6/2023 Pabón ..................... G06F 9/541 719/328
2023/0229305 A1* 7/2023 Amdur .................. G06F 3/0607 711/154
2023/0342496 A1* 10/2023 Doshi ................. G06F 21/6281
2024/0020146 A1* 1/2024 Vijayvargiya .......... G06F 9/455
2024/0202008 A1* 6/2024 Palacherla .............. G06F 9/442
2024/0244105 A1* 7/2024 Sivakumar .......... H04L 67/1008
2025/0021367 A1* 1/2025 Juneja ................. G06F 9/45558

* cited by examiner

*Primary Examiner* — Tuan C Dao
(74) *Attorney, Agent, or Firm* — Anderson Gorecki LLP

(57) ABSTRACT

A Kubernetes migration orchestration manager includes a virtual CSI driver and a pod monitor interface. The virtual CSI driver enables the Kubernetes migration orchestration manager to interact with multiple types of storage system, to ensure that persistent volumes created on a first storage system type are able to be created and synchronized on a second storage system type. The pod monitor interface enables the Kubernetes migration orchestration manager to interact with the pod monitor of the Kubernetes cluster to artificially cause the pod monitor to apply a taint to nodes on the first site. This causes the pod monitor to shut down pods on Site A and to restart the pods on Site B. By stretching persistent volumes to Site B storage system and sequentially migrating pods to Site B, it is possible to orchestrate migration of the k8s cluster without shutting down the k8s cluster.

20 Claims, 13 Drawing Sheets

FIG. 10

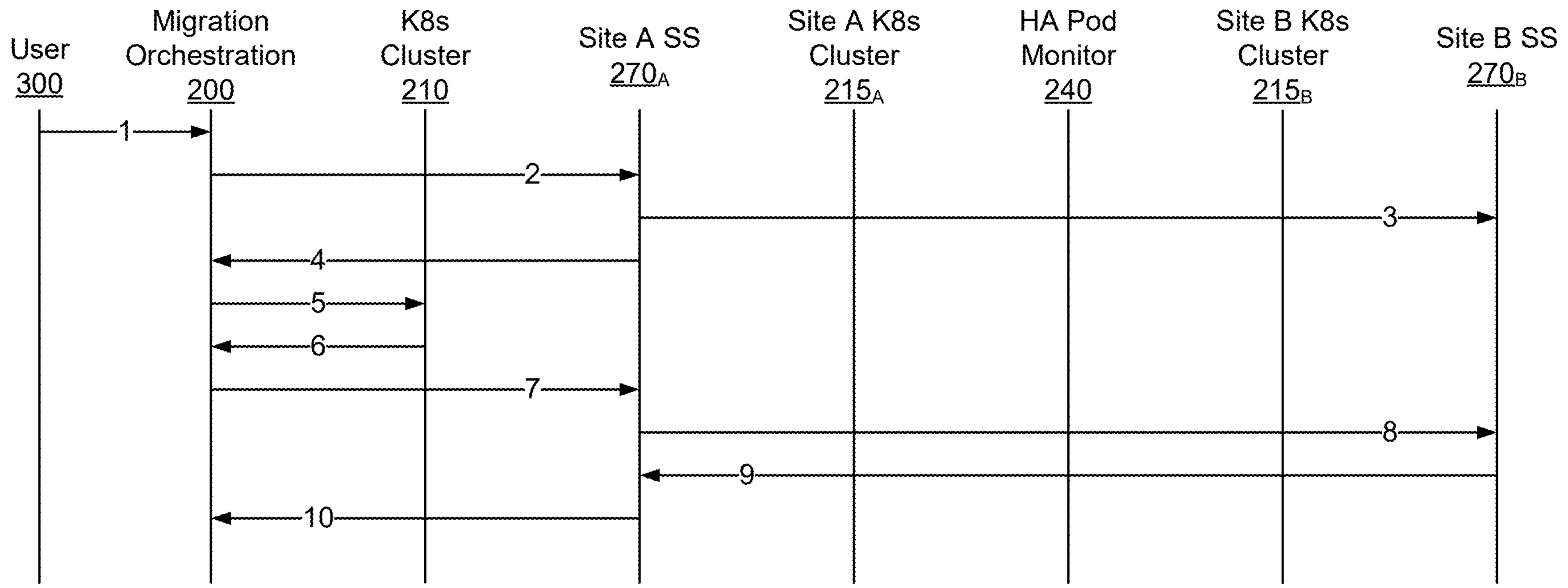

Arrow 1: User initiate Kubernetes migration, including both compute and storage
Arrow 2: K8s migration orchestration manager instructs local storage system to connect with remote storage system
Arrow 3: Site A storage system connects to Site B storage system
Arrow 4: Storage systems connected
Arrow 5: Request list of storage volumes used by Site A Kubernetes cluster
Arrow 6: List of storage volumes returned
Arrow 7: Instruct local storage system to stretch the given set of volumes to the Site B storage system
Arrow 8: Transfer snapshot image of storage volumes and achieve synchronized state
Arrow 9: Synchronized state attained
Arrow 10: Storage volumes stretched

FIG. 11

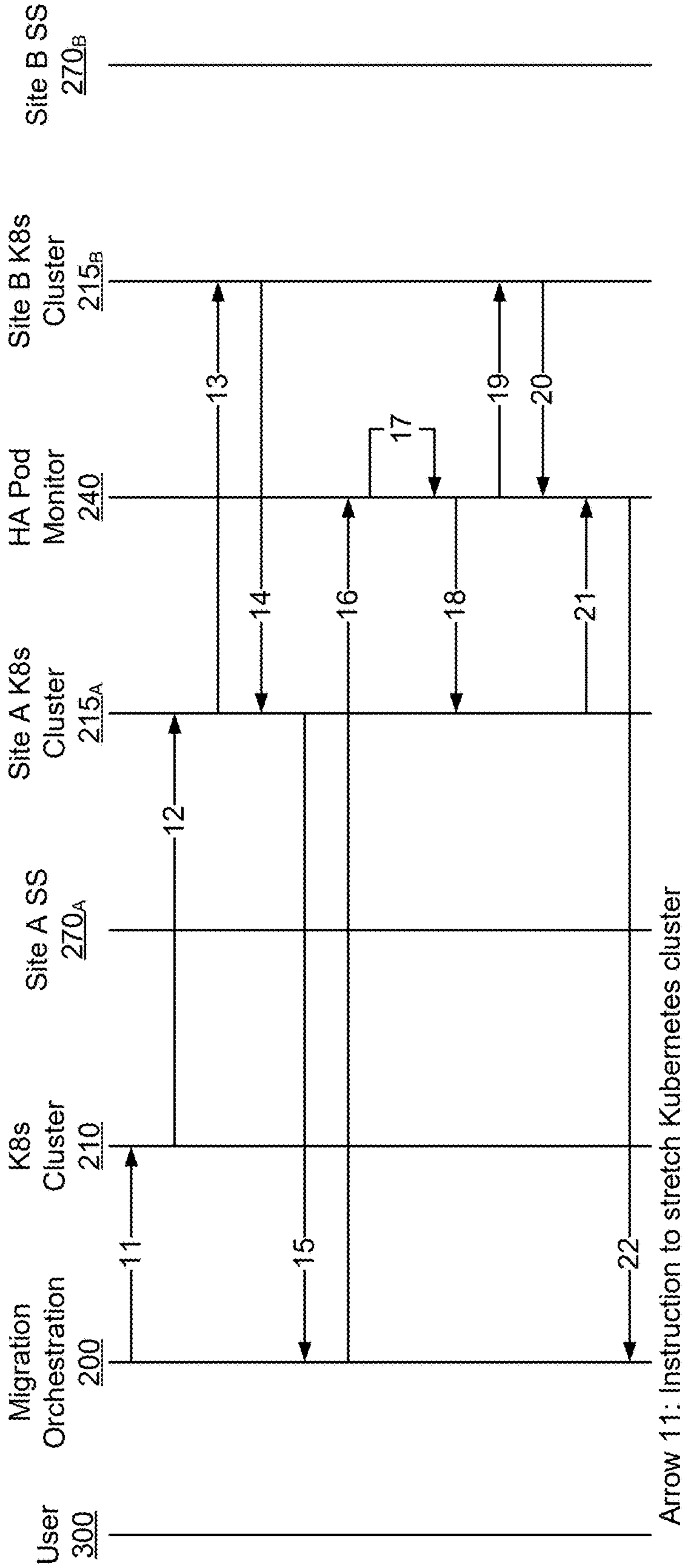

Arrow 11: Instruction to stretch Kubernetes cluster
Arrow 12: Instruction to Site A Kubernetes cluster to stretch Kubernetes cluster
Arrow 13: Instruction from Site A Kubernetes cluster to Site B Kubernetes cluster to stretch Kubernetes cluster
Arrow 14: Return success
Arrow 15: Return success
Arrow 16: Move pods of Site A Kubernetes cluster to Site B Kubernetes cluster
Arrow 17: Implement restart sequence iterating arrows 18-21 for each pod or for groups of pods:
Arrow 18: Shut down pod(s)
Arrow 19: Start pod(s)
Arrow 20: Pod(s) started
Arrow 21: Pod(s) shut down
Arrow 22: Pods moved

FIG. 12

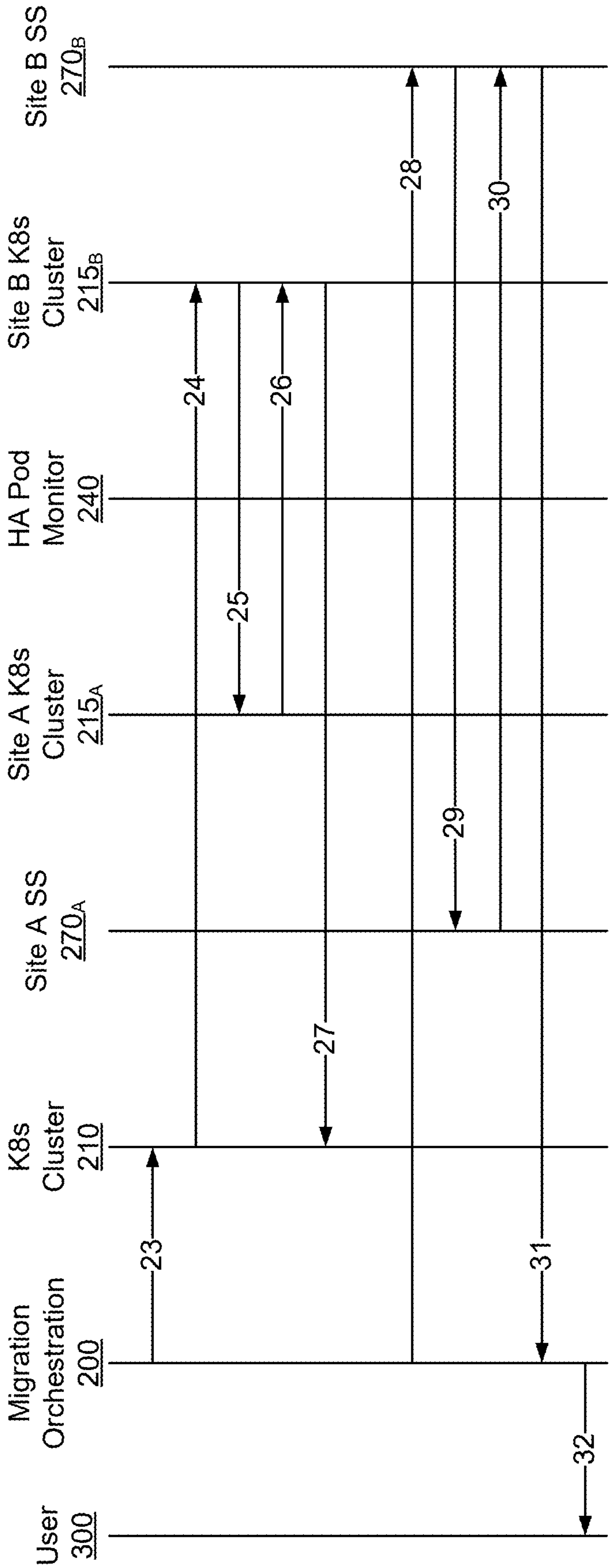

Arrow 23: Remove Kubernetes stretch cluster
Arrow 24: Instruction to Site B Kubernetes cluster to unstretch Kubernetes cluster
Arrow 25: Instruction from Site B Kubernetes cluster to Site A Kubernetes cluster to unstretch Kubernetes cluster
Arrow 26: Return success
Arrow 27: Return success
Arrow 28: Instruction to remove the stretch volume
Arrow 29: Instruction from remote storage system to local storage system to remove synchronized state
Arrow 30: Synchronized state removed
Arrow 31: Return success
Arrow 32: Kubernetes cluster migration complete

AUTOMATED KUBERNETES MIGRATION ORCHESTRATION

FIELD

This disclosure relates to computing systems and related devices and methods, and, more particularly, to a method and apparatus for orchestrating Kubernetes migration, including automated Kubernetes migration orchestration of both storage mobility and compute mobility between heterogeneous or homogenous underlying storage systems.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, an automated Kubernetes migration orchestration process is provided that enables both storage mobility and compute mobility between heterogeneous or homogenous underlying storage systems. As used herein, the term "automated" is used to refer to a process independent of human intervention.

According to some embodiments, a Kubernetes migration orchestration manager is provided that is configured to migrate Kubernetes clusters between heterogeneous storage systems. In some embodiments, the Kubernetes migration orchestration manager includes a virtual CSI driver and a pod monitor interface. The virtual CSI driver is provided to enable the Kubernetes migration orchestration manager to interact with multiple types of storage systems, to ensure that persistent volumes created on a first storage system type are able to be created and synchronized on a second storage system type to enable storage to be stretched between heterogenous storage systems. The pod monitor interface, in some embodiments, is used to interact with the High Availability (HA) pod monitor to artificially cause the HA pod monitor to apply a taint to worker nodes on Site A, to cause the pods on the worker node to be shut down on Site A and restarted on worker nodes on Site B. This enables the native ability of the HA pod monitor to detect failed pods and to restart the pods, to be used by the Kubernetes migration orchestration manager to cause the compute resources of the Kubernetes cluster to be sequentially moved from Site A to Site B in an orderly manner. By enabling migration to occur without requiring the Kubernetes cluster to be shut down during the migration process, it is possible to migrate the Kubernetes cluster while minimizing the impact on the applications executing on the pods during the migration process.

In some embodiments, a method of orchestrating migration of a Kubernetes cluster between heterogeneous storage systems, includes determining, by a Kubernetes migration orchestration manager, a first set of persistent volumes used by the Kubernetes cluster at a first Kubernetes cluster site, the first set of persistent volumes being provided to the Kubernetes cluster site by a first storage system, and stretching the first set of persistent volumes from the first storage system to a second set of persistent volumes on second storage system. The method also includes stretching the Kubernetes cluster to include both the first Kubernetes cluster site and a second Kubernetes cluster site, the second Kubernetes cluster site obtaining the second set of persistent volumes from the second storage system, sequentially applying a taint to Kubernetes nodes by a high availability Kubernetes pod monitor on the first Kubernetes cluster site to cause Kubernetes pods to be sequentially shut down on the first Kubernetes cluster site and sequentially restarted on the second Kubernetes cluster site, and after all Kubernetes nodes have been tainted on the first Kubernetes cluster site, unstretching the Kubernetes cluster to only include the second Kubernetes cluster site.

In some embodiments, the first storage system and second storage system are heterogeneous.

In some embodiments, stretching the first set of persistent volumes from the first storage system to the second storage system includes creating corresponding second set of persistent volumes on the second storage system, copying data from the first set of persistent volumes to the second set of persistent volumes, and achieving a synchronized state between the second set of persistent volumes and the first set of persistent volumes.

In some embodiments, the method further includes mapping, by a virtual Container Storage Interface (CSI) driver, second persistent volume identifiers of the second set of persistent volumes to first persistent volume identifiers of the first set of persistent volumes.

In some embodiments, the method further includes accessing the first set of persistent volumes by the pods on the first Kubernetes cluster site by using the first persistent volume identifiers, and accessing the second set of persistent volumes using by the pods on the second Kubernetes cluster by using the same first persistent volume identifiers and the virtual CSI driver mapping to provide continued access to the persistent volumes without reconfiguring the pods to directly address the second set of persistent volumes.

In some embodiments, the CSI driver contains a CSI driver to interface with multiple types of heterogeneous storage systems.

In some embodiments, the persistent volumes include persistent volume objects and persistent volume claim objects.

In some embodiments, the method further includes unstretching the first set of persistent volumes by removing the synchronized state between the second set of persistent volumes and the first set of persistent volumes.

In some embodiments, sequentially applying the taint to Kubernetes nodes by the high availability Kubernetes pod monitor on the first Kubernetes cluster site to cause the Kubernetes pods to be sequentially shut down on the first Kubernetes cluster site and sequentially restarted on the second Kubernetes cluster site includes selecting a given Kubernetes pod on the first Kubernetes cluster site, stopping the given Kubernetes pod on the first Kubernetes cluster site, and starting a corresponding Kubernetes pod on the second Kubernetes cluster site before selecting a subsequent node containing a subsequent Kubernetes pod to be tainted. In some embodiments, the Kubernetes pods are implementing multiple instances of an executing user application, and causing the Kubernetes pods to be sequentially shut down on the first Kubernetes cluster site and sequentially restarted on the second Kubernetes cluster site enables continued access to the executing user application.

In some embodiments, a system for orchestrating migration of a Kubernetes cluster between heterogeneous storage systems, includes one or more processors and one or more storage devices storing instructions that are operable, when executed by the one or more processors, to cause the one or more processors to perform operations including determining, by a Kubernetes migration orchestration manager, a first set of persistent volumes used by the Kubernetes cluster at a first Kubernetes cluster site, the first set of persistent volumes being provided to the Kubernetes cluster site by a first storage system, and stretching the first set of persistent volumes from the first storage system to a second set of persistent volumes on second storage system. The operations also includes stretching the Kubernetes cluster to include both the first Kubernetes cluster site and a second Kubernetes cluster site, the second Kubernetes cluster site obtaining the second set of persistent volumes from the second storage system, sequentially applying a taint to Kubernetes nodes by a high availability Kubernetes pod monitor on the first Kubernetes cluster site to cause Kubernetes pods to be sequentially shut down on the first Kubernetes cluster site and sequentially restarted on the second Kubernetes cluster site, and after all Kubernetes nodes have been tainted on the first Kubernetes cluster site, unstretching the Kubernetes cluster to only include the second Kubernetes cluster site.

In some embodiments, the first storage system and second storage system are heterogeneous.

In some embodiments, stretching the first set of persistent volumes from the first storage system to the second storage system includes creating corresponding second set of persistent volumes on the second storage system, copying data from the first set of persistent volumes to the second set of persistent volumes, and achieving a synchronized state between the second set of persistent volumes and the first set of persistent volumes.

In some embodiments, the operations further includes mapping, by a virtual Container Storage Interface (CSI) driver, second persistent volume identifiers of the second set of persistent volumes to first persistent volume identifiers of the first set of persistent volumes.

In some embodiments, the operations further includes accessing the first set of persistent volumes by the pods on the first Kubernetes cluster site by using the first persistent volume identifiers, and accessing the second set of persistent volumes using by the pods on the second Kubernetes cluster by using the same first persistent volume identifiers and the virtual CSI driver mapping to provide continued access to the persistent volumes without reconfiguring the pods to directly address the second set of persistent volumes.

In some embodiments, the CSI driver contains a CSI driver to interface with multiple types of heterogeneous storage systems.

In some embodiments, the persistent volumes include persistent volume objects and persistent volume claim objects.

In some embodiments, the operations further includes unstretching the first set of persistent volumes by removing the synchronized state between the second set of persistent volumes and the first set of persistent volumes.

In some embodiments, sequentially applying the taint to Kubernetes nodes by the high availability Kubernetes pod monitor on the first Kubernetes cluster site to cause the Kubernetes pods to be sequentially shut down on the first Kubernetes cluster site and sequentially restarted on the second Kubernetes cluster site includes selecting a given Kubernetes pod on the first Kubernetes cluster site, stopping the given Kubernetes pod on the first Kubernetes cluster site, and starting a corresponding Kubernetes pod on the second Kubernetes cluster site before selecting a subsequent node containing a subsequent Kubernetes pod to be tainted. In some embodiments, the Kubernetes pods are implementing multiple instances of an executing user application, and causing the Kubernetes pods to be sequentially shut down on the first Kubernetes cluster site and sequentially restarted on the second Kubernetes cluster site enables continued access to the executing user application.

BRIEF DESCRIPTION OF THE DRAWINGS

FIGS. 10-12 are swim lane diagrams illustrating automated Kubernetes migration orchestration of a Kubernetes cluster from Site A to Site B, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
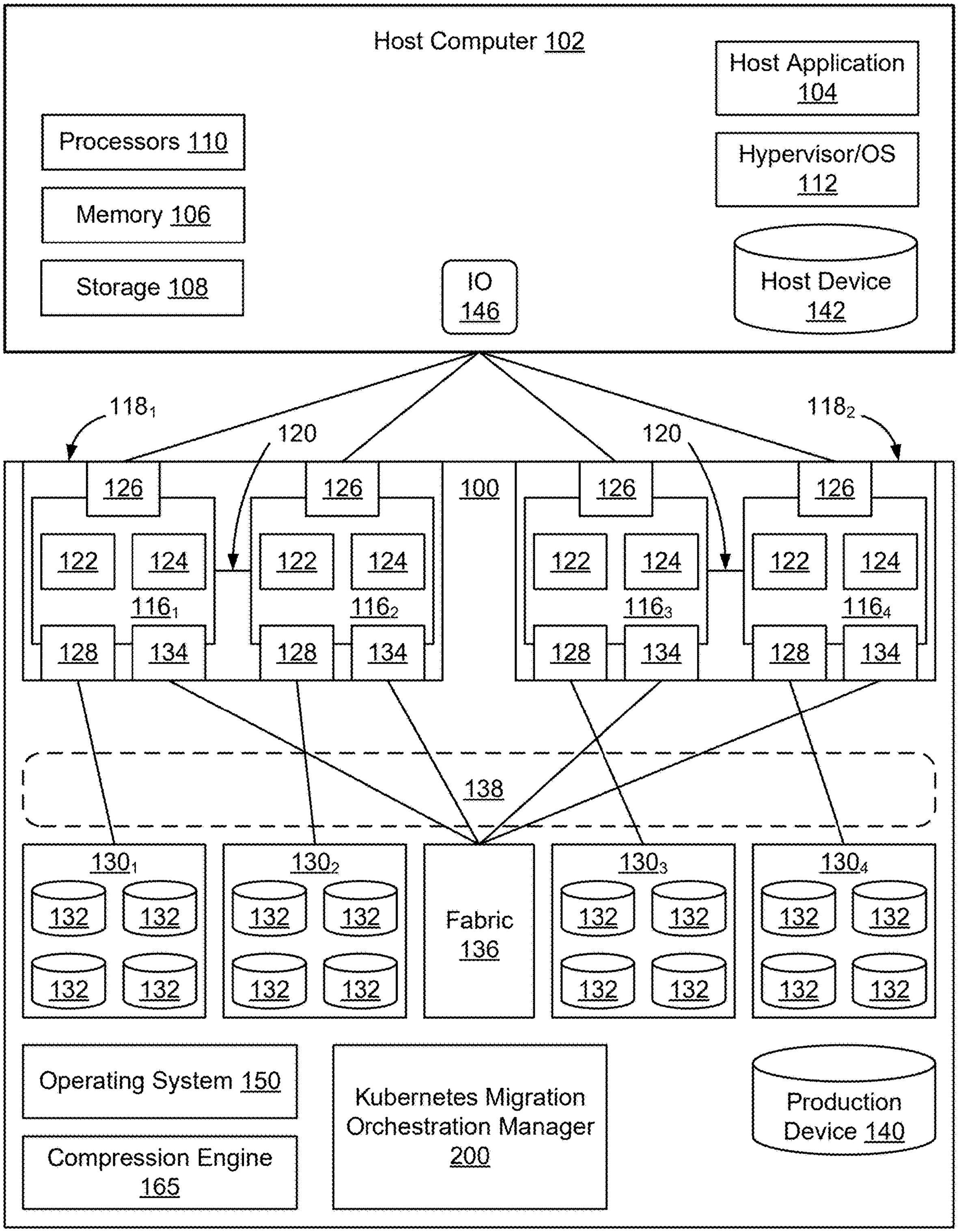
FIG. 1 is a functional block diagram of an example storage system connected to a host computer, the storage system having a Kubernetes migration orchestration manager, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes 116$_1$-116$_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible, then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes 116$_1$-116$_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

As shown in FIG. 1, in some embodiments the storage system 100 includes a Kubernetes migration orchestration manager 200. As described in greater detail herein, in some embodiments the Kubernetes migration orchestration manager 200 is configured to orchestrate migration of both storage resources and compute resources of a Kubernetes cluster from a first site (Site A) to a second site (Site B). Although an example Kubernetes migration orchestration process is described in connection with migration between a pair of Sites (Site A and Site B), it should be understood that the same process can be used to orchestrate Kubernetes migration from a single first Site to multiple second Sites, from multiple first Sites to a single second Site, or from multiple first Sites to multiple second Sites. Accordingly, although some embodiments are described in connection with migration between a single first Site and a single second Site, it should be understood that the these examples are not intended to limit application of the Kubernetes migration orchestration described herein. Additionally, although FIG. 1 shows the Kubernetes migration orchestration manager 200 implemented as a process on a storage system 100, it should be understood that the Kubernetes migration orchestration manager 200 may also be implemented outside of the storage system 100, such as on host 102.

Figure 2:
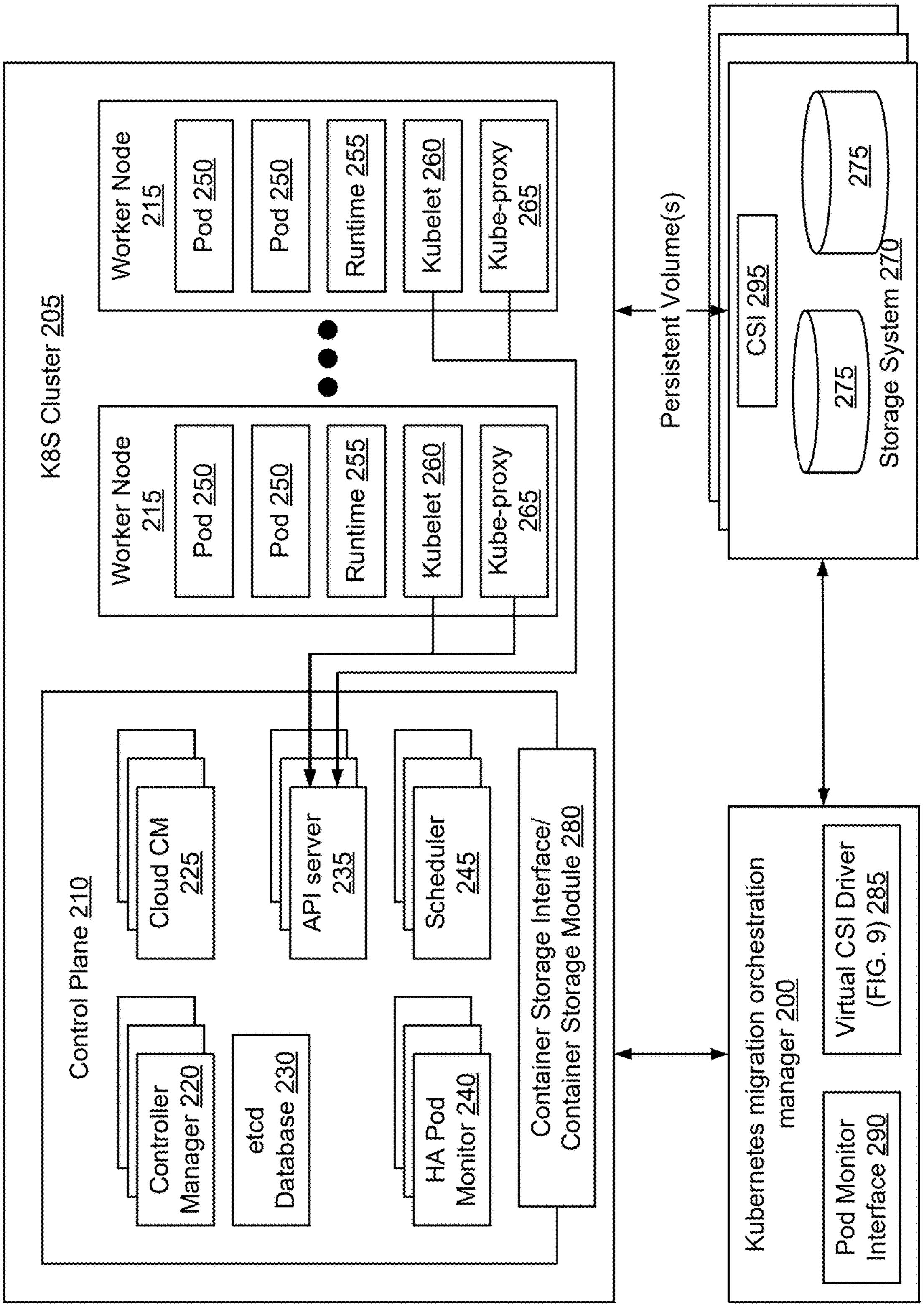
FIG. 2 is a block diagram of an example Kubernetes cluster, according to some embodiments.

Kubernetes, also referred to herein as K8s, is an open-source container orchestration system for automating software deployment, scaling, and management. FIG. 2 is a block diagram of an example Kubernetes cluster, according to some embodiments. As shown in FIG. 2, in some embodiments a Kubernetes cluster includes a set of worker nodes 215, each of which includes at least one pod 250, and a control plane 210. Worker nodes 215 are also referred to herein as "nodes". A node may be a virtual or physical machine, depending on the cluster.

Kubernetes runs workload by placing containers into the pods 250 to run on the worker nodes 215. Each node also contains the services necessary to run the pods 250. For example, in FIG. 2 the nodes 215 are shown as including a container runtime 255, a kubelet 260, and a kube-proxy 265. The container runtime 255 provides the runtime environment for the containers of the pods 250. The kubelet 260 is an agent that runs on each node in the cluster, and makes sure that the containers are running and healthy in the pod. The kube-proxy is a network proxy that runs on each node in the cluster, and maintains network rules on the nodes to allow network communication to the pods from network sessions inside or outside of the cluster. Pods are the smallest deployable unit of computing that can be created and managed in Kubernetes. A pod is a group of one or more containers, with shared storage and network resources and a specification for how to run the containers.

As shown in FIG. 2, a Kubernetes cluster also includes a control plane 210. The control plane has multiple components. For example, as shown in FIG. 2, in some embodiments the Kubernetes cluster includes one or more instances of a controller manager 220, optional cloud controller manager 225, an etcd database 230, API server 235, High Availability (HA) pod monitor 240, and scheduler 245. The control plane manages the worker nodes 215 and the pods in the cluster. The control plane 210 components make global decisions about the cluster, as well as detect and respond to cluster events.

In some embodiments, the API server 235 exposes the Kubernetes Application Programming Interface (API) to provide a front-end for the Kubernetes cluster. The etcd database 230 is used to store all cluster metadata describing the cluster, such as data describing the nodes 215 and the persistent volumes 275 used by the nodes 215. The High Availability (HA) pod monitor 240 is provided to ensure high availability of the pods 250. When the HA pod monitor 240 determines that a node 215 is unavailable, it applies a taint to the node 215 to cause the pods 250 on the node 215 to be shut down and restarted elsewhere in the Kubernetes cluster 205. This enables pods to be automatically restarted to thereby assure high availability of the services provided by the pods. The scheduler 245 watches for newly created pods with no assigned node, and selects a node for the pod to run on. The controller manager 220 is provided to run controller processes. There might be multiple types of controller managers, such as a node controller, job controller, etc. The cloud controller manager 225, if instantiated, embeds cloud-specific control logic to link clusters to cloud provider APIs.

The Kubernetes cluster obtains storage resources such as block and file storage via persistent volume claim objects, which represent a need for provisioned storage, and persistent volume objects, which represent storage that has been provisioned. Persistent volume claim objects and persistent volume objects are collectively referred to herein as "persistent volumes" 275. Container Storage Interface (CSI) and Container Storage Object Interface plugins 280 offer a way to expose a uniform layer across block, file, and object storage systems to containerized workloads on container orchestration systems such as the Kubernetes cluster shown in FIG. 2. Container Storage Modules (CSMs) are a set of technologies that extend the capabilities of the CSI drivers, improving the observability, resiliency, protection, usability, and data mobility for application which leverage the capabilities of the underlying storage systems. For example, as shown in FIG. 2, a Container Storage Interface (CSI) driver/Container Storage Module (CSM) 280 enables the Kubernetes cluster to interact with the container storage interface 295 on the storage system 100 to consume storage from the underlying storage system 100 and take advantage of the underlying features of the storage system. Example features of the storage system may include the ability to create point-in-time copies of storage volumes 275, the ability to mirror storage volumes 275 between similarly configured storage systems, and other features provided by the underlying storage system.

Unfortunately, one of the problems with container storage modules is that the provisioning of storage is generally array type specific. For example, different types of storage systems manufactured by a given company, or storage systems manufactured by different companies, may use different commands to create/manage storage volumes and, accordingly, require the use of different CSI drivers. Hence, heterogeneous storage systems often will have different CSI interfaces 295, thus requiring the Kubernetes cluster to employ different CSI drivers 280 if the Kubernetes cluster is to consume storage resources from different types of storage systems.

There are times when it might be advantageous to cause a Kubernetes cluster to be relocated from a first site (Site A) to a second site (Site B). As used herein, the term "migrate" is used to refer to moving a Kubernetes cluster from a first Site to a second Site without shutting down and restarting the Kubernetes cluster.

To migrate a Kubernetes cluster, both compute and storage must be moved from Site A to Site B. This means that the persistent volumes used by the pods must be moved from Site A to Site B, and the pods that use the persistent volumes must be moved from Site A to Site B. Unfortunately, a problem can occur when trying to migrate a Kubernetes cluster in situations where the underlying storage systems at Site A to Site B are heterogeneous. Specifically, since container storage modules are array specific, differences in interfaces and semantics of the underlying storage systems can make it difficult to move data between different array types or from a storage system to a cloud storage provider. Specifically, if the naming conventions of the persistent volumes is changed when the persistent volumes are moved from a first type of storage system to a second type of storage system, the Kubernetes cluster will need to be reconfigured to enable operation on the second storage system.

According to some embodiments, a Kubernetes migration orchestration manager 200 is provided that is configured to migrate Kubernetes clusters between heterogeneous storage systems. In some embodiments, as shown in FIG. 2, the Kubernetes migration orchestration manager 200 includes a virtual CSI driver 285 and a pod monitor interface 290. Additional details regarding an example virtual CSI driver 285 are provided in connection with FIG. 9. Briefly, in some embodiments, the virtual CSI driver 285 is provided to enable the Kubernetes migration orchestration manager 200 to interact with multiple types of storage systems, to ensure that the persistent volumes that are created on a first type of storage system are able to be created and synchronized on a different type of storage system by providing an abstraction for the persistent volume identifiers. By providing a virtual CSI driver, it is possible to avoid reconfiguration of the persistent volumes when pods are restarted from a different storage end-point, even though the new storage end point might use an entirely different naming convention and have a different set of APIs.

The pod monitor interface 290, in some embodiments, is used to interact with the pod monitor 240 to artificially cause the pod monitor to apply a taint to nodes 215 on Site A, to cause the pods on the node to be shut down on Site A and restarted on nodes 215 on Site B. The pod monitor interface thus enables the Kubernetes migration orchestration manager to rely on the native ability of the pod monitor to detect failed pods and to restart the pods in connection with causing the compute resources of the Kubernetes cluster to be moved from Site A to Site B. By sequentially applying a taint to each of the nodes 215 on Site A, and methodically waiting to have the pod monitor restart the pods on Site B, it is possible to maintain the operational state of the Kubernetes cluster during the migration process such that the Kubernetes cluster does not need to be shut down to implement the migration process thus minimizing impact of the migration on applications executing within the pods.

Figure 3:
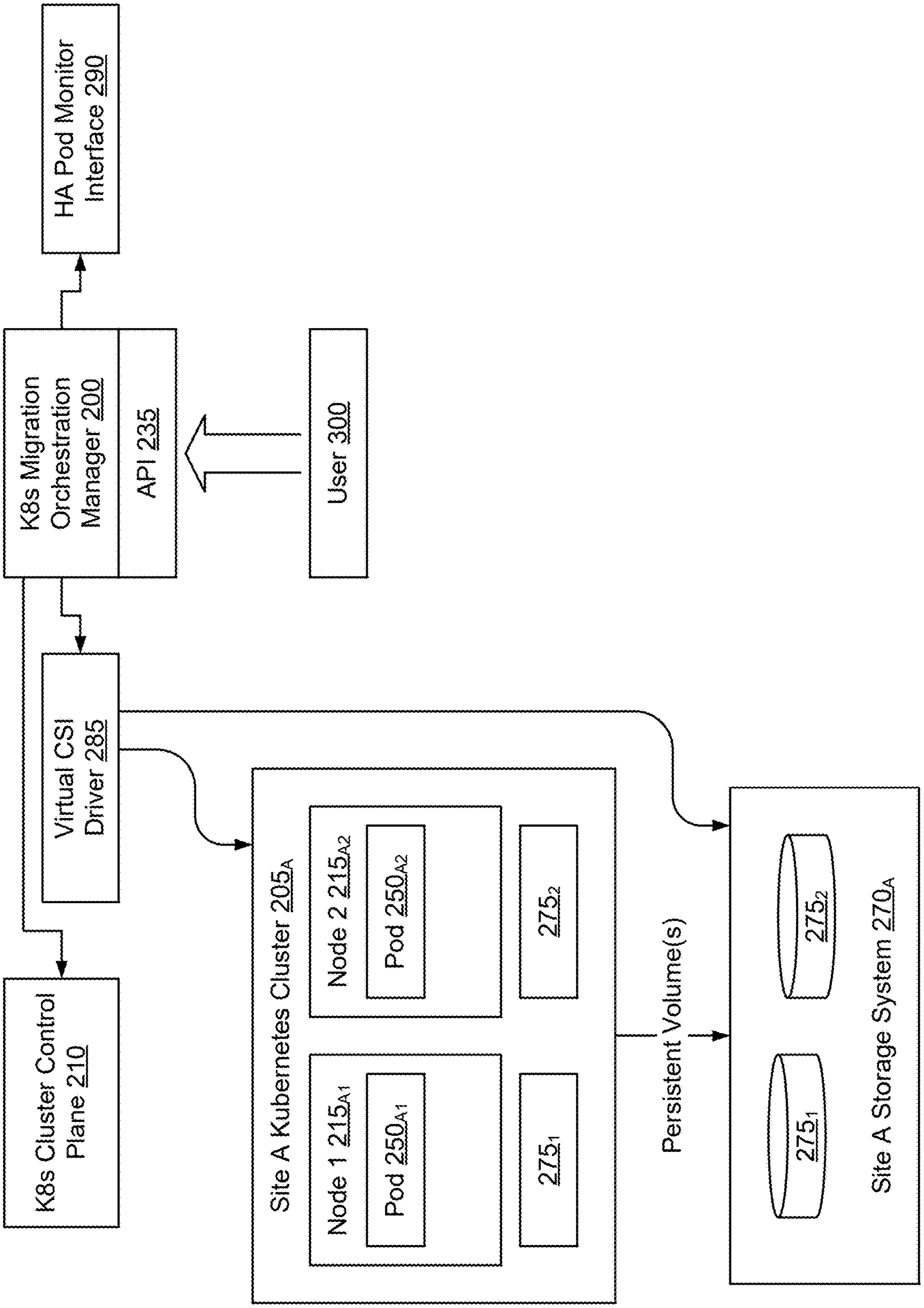
FIG. 3 is a block diagram of an example Kubernetes cluster including compute and storage resources at Site A at the start of a Kubernetes migration process from Site A to Site B, according to some embodiments.

FIG. 3 is a block diagram of an example Site A Kubernetes cluster 205$_A$ including compute and storage resources at the start of a Kubernetes migration process to Site B, according to some embodiments. As shown in FIG. 3, in this example Site A Kubernetes cluster 205$_A$ includes two nodes—Node 1 215$_{A1}$ and Node 2 215$_{A2}$. Each node has a set of one or more pods 250. In the example shown in FIG. 3, node 215$_{A1}$ includes pod 250$_{A1}$, and node 215$_{A2}$ includes pod 250$_{A2}$. Although the nodes in FIG. 3 are shown as each having a single pod for simplicity of description, it should be understood that the nodes may have more than one pod depending on the implementation. As shown in FIG. 3, Virtual CSI Driver 285 has created a set of persistent volumes 275$_1$, 275$_2$ for use by the nodes 215$_{A1}$, 215$_{A2}$, of Site A Kubernetes cluster 205$_A$. Although the illustrated example shows two persistent volumes 275$_1$, 275$_2$, it should be understood that any number of persistent volumes may be created and made available to the nodes of Site A Kubernetes cluster 205$_A$. The persistent volumes are created on a Site A storage system 270$_A$. In FIG. 3, the Site A storage system 270$_A$ is a first type of storage system.

As shown in FIG. 3, in some embodiments the Kubernetes migration orchestration manger 200 includes an API 235 that enables a user 300 to instruct the Kubernetes migration orchestration manger 200 to migrate the Site A Kubernetes cluster 205$_A$ to Site B. In this context, migration includes migration of both persistent volumes from the Site A storage system to Site B storage system, and the migration of compute resources from Site A to Site B. In some embodiments, when migration is initiated, the Kubernetes migration orchestration manger 200 first migrates storage resources of the Kubernetes cluster from a Site A storage system to a Site B storage system by causing a synchronized copy of the persistent volumes to be present at the Site B storage system 270$_B$. In some embodiments, the virtual CSI driver 285 enables migration in instances where the Site A storage system 270$_A$ and the Site B storage system 270$_B$ are of different storage system types.

Figure 4:
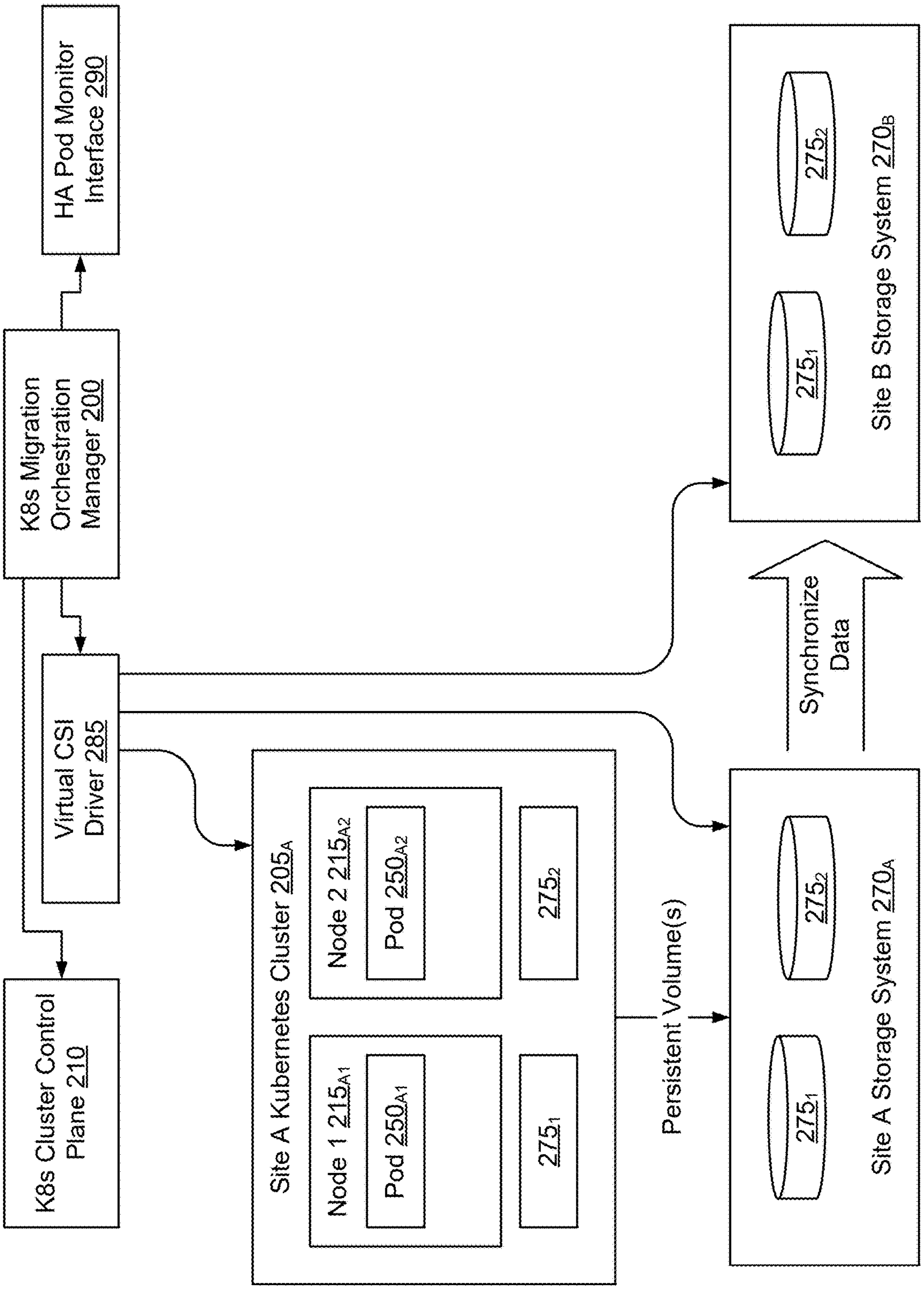
FIG. 4 is a block diagram of the example Kubernetes cluster of FIG. 3 during the Kubernetes migration process, graphically showing orchestration of migration of storage volumes between Site A and Site B, according to some embodiments.

FIG. 4 is a block diagram of the example Kubernetes cluster of FIG. 3 during the Kubernetes migration process, graphically showing orchestration of migration of persistent volumes 275$_1$, 275$_2$, between Site A and Site B, according to some embodiments. As shown in FIG. 4, in some embodiments the virtual CSI driver 285 instructs the Site A storage system 270$_A$ to take a snapshot (point-in-time copy) of each of the persistent volumes 275 and to send the snapset (snapshot of each persistent volume) to the Site B storage system 270$_B$. Additional snapshots can be sent to synchronize the persistent volumes 275$_1$, 275$_2$, on the Site B storage system 270$_B$ with the content of the persistent volumes 275$_1$, 275$_2$, on the Site A storage system 270$_A$. Once the Site B storage system 270$_B$ has a consistent copy of the persistent volumes 275$_1$, 275$_2$, storage is synchronized between the Site A storage system 270$_A$ and Site B storage system 270$_B$.

The synchronous relationship may be implemented in different ways depending on the implementation. In some embodiments, synchronization of the content of the persistent volumes between the Site A storage system 270$_A$ and Site B storage system 270$_B$ is implemented by causing the Site A storage system 270$_A$ to write any new data to the Site B storage system 270$_B$ using a technique such as data replication. In other embodiments, host-based replication may be utilized to cause host write IO operations to be automatically provided to the persistent volumes 275$_1$, 275$_2$, on both the Site A storage system 270$_A$ and on the Site B storage system 270$_B$.

Figure 5:
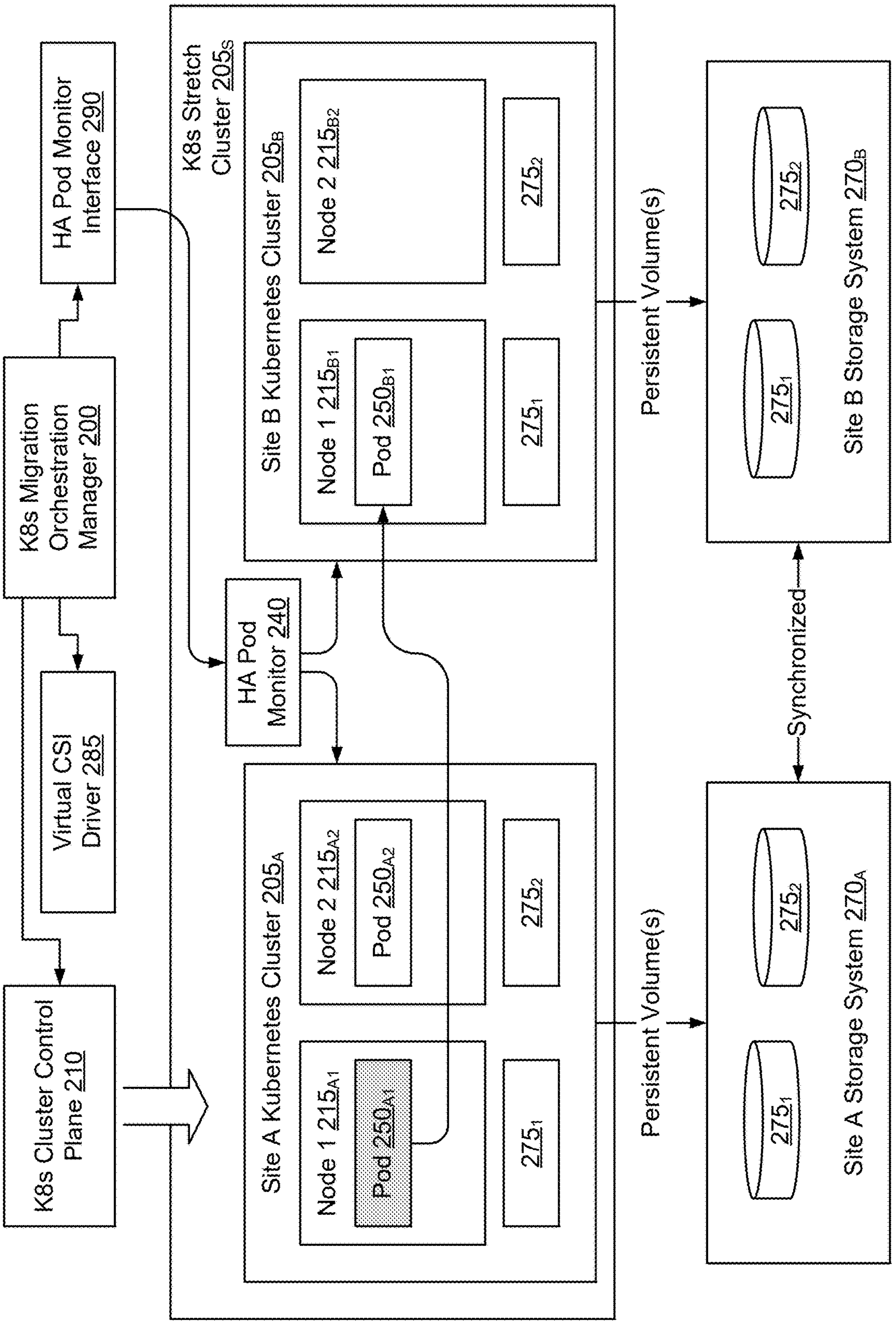
FIGS. 5 and 6 are block diagrams of the example Kubernetes cluster of FIG. 3 during the Kubernetes migration process, graphically showing orchestration of migration of compute resources from Site A to Site B, according to some embodiments.
Figure 6:
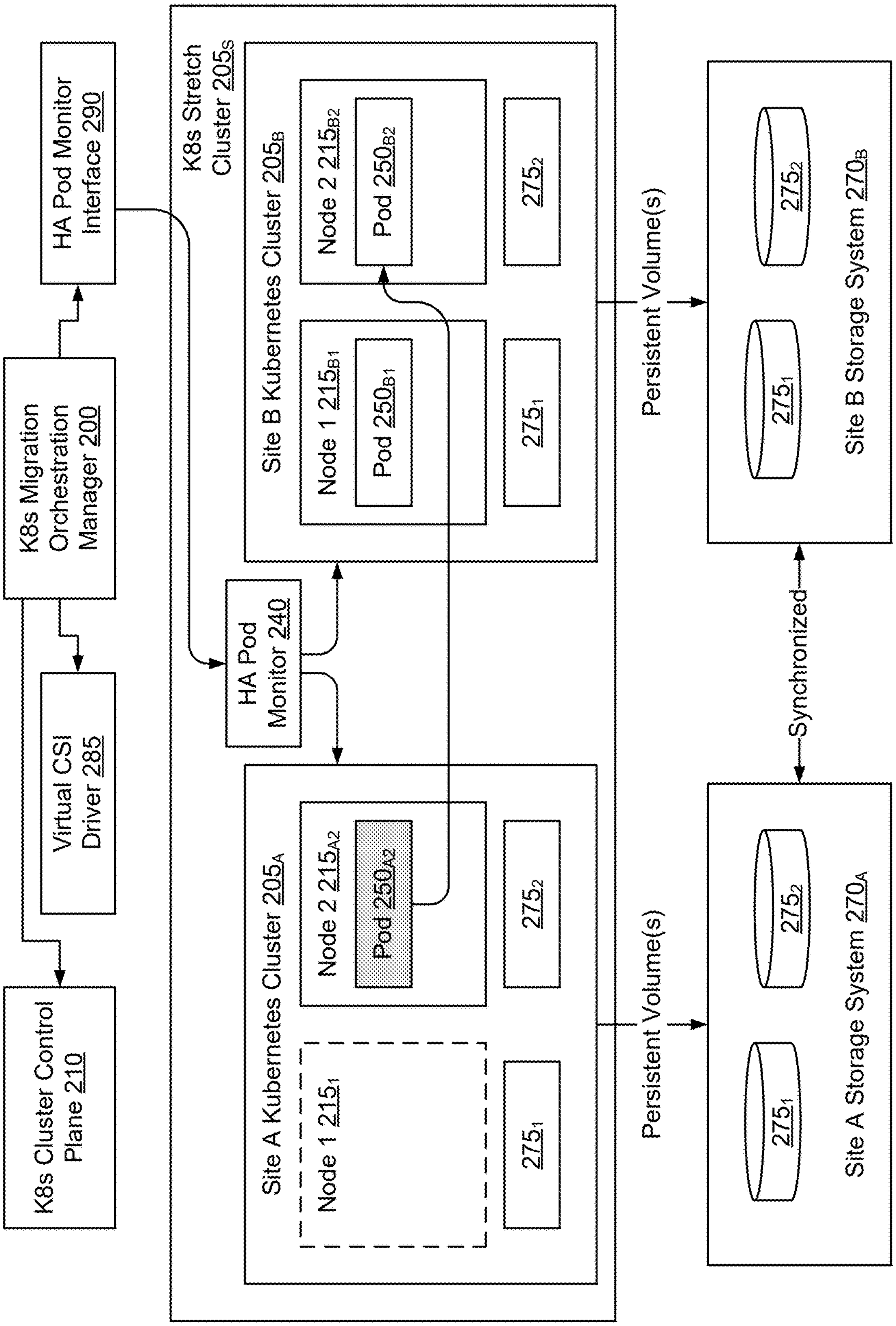

FIGS. 5 and 6 are block diagrams of the example Kubernetes cluster of FIG. 3 during the Kubernetes migration process, graphically showing orchestration of migration of compute resources from Site A to Site B, according to some embodiments. As shown in FIG. 5, in some embodiments the K8s cluster is stretched to create a K8s stretch cluster 205$_S$ including both the Site A Kubernetes cluster 205$_A$ and a Site B Kubernetes cluster 205$_B$. An orchestration process is then used to selectively cause subsets of the pods on nodes of the Site A Kubernetes cluster 205$_A$ to be shut down and restarted on the Site B Kubernetes cluster 205$_B$ in an orderly manner, to migrate nodes and pods from the Site A Kubernetes cluster 205$_A$ to the Site B Kubernetes cluster 205$_B$ while minimizing impact to the applications running in the pods of the stretched Kubernetes cluster 205$_S$.

In some embodiments, the pod monitor interface 290 interacts with the High Availability (HA) pod monitor 240 of the control plane 205 of the Kubernetes cluster to cause the pod monitor 240 to artificially apply a taint to the nodes of Site A Kubernetes cluster 205$_A$ to cause the nodes 215$_{A1}$, 215$_{A2}$ of Site A Kubernetes cluster 205$_A$ to be sequentially shut down on Site A Kubernetes cluster 205$_A$ and restarted as nodes 215$_{B1}$, and 215$_{B2}$ on Site B Kubernetes cluster 205$_B$. When a pod of Site A Kubernetes cluster 205$_A$ is shut down, the pod monitor automatically causes a replacement pod to be started within the stretch cluster, specifically on one of the nodes of Site B. Sequentially, the pods are shut down on Site A and restarted in nodes on Site B, to effect migration of compute resources from Site A Kubernetes cluster 205$_A$ to Site B Kubernetes cluster 205$_B$. By sequentially applying a taint to individual nodes of Site A Kubernetes cluster 205$_A$ and waiting for corresponding nodes and pods to be started at the Site B Kubernetes cluster 205$_B$, before applying a taint to a subsequent node at the Site A Kubernetes cluster 205$_A$, it is possible to gradually transition compute resources from Site A Kubernetes cluster 205$_A$ to Site B Kubernetes cluster 205$_B$, without requiring execution of the Kubernetes cluster to be stopped during the migration orchestration process. This orderly sequence, after implementing the required storage synchronization and by leveraging the virtual CSI driver, ensures that the user applications running on these pods can have very minimal impact and, in some cases, no impact, during the entire migration process.

In some embodiments, the pod monitor 240 is deployed as a sidecar in both the controller pod (pod implementing the control plane) and worker pods. The pod monitor 240 in the controller pod, in some embodiments, is configured to monitor the worker pods and nodes 215. If a node is determined to have failed for some reason, a taint is applied to the node by the pod monitor 240. If a pod is determined to be resident on a node with a taint, the controller pod monitor is configured to clean up the pod so that a replacement pod can be scheduled. Essentially, the pod monitor 240, in some embodiments, is configured to take actions to prevent pods on a tainted node from accessing the persistent volumes and to forcibly shut down the pods on the tainted node. Forcing a pod to shut down enables a replacement pod to be restarted elsewhere in the Kubernetes cluster, thus providing for high availability within the Kubernetes cluster.

In some embodiments, the pod monitor interface 240 identifies a node of Site A Kubernetes cluster 205$_A$ that should be moved to Site B Kubernetes cluster 205$_B$. In FIG. 5 the Kubernetes migration orchestration manager 200 has instructed the HA pod monitor 240, via the pod monitor interface 290, that a taint should be applied to node 215$_{A1}$ to cause the pod 250$_{A1}$ on node 215$_{A1}$ to be shut down and restarted. When the pod 250$_{A1}$ on node 215$_{A1}$ is shut down, it is restarted as pod 250$_{B1}$ on node 215$_{B1}$ on Site B Kubernetes cluster 205$_B$. This causes the compute resources associated with node 215$_{A1}$ to be moved from Site A Kubernetes cluster 205$_A$ to Site B Kubernetes cluster 205$_B$. As shown in FIG. 6, after node 215$_{A1}$ has been shut down, the Kubernetes migration orchestration manager 200 next instructs the pod monitor 240 via the pod monitor interface 290 that a taint should be applied to node 215$_{A2}$. Applying a taint to node 215$_{A2}$ causes the pod monitor 240 to cause the pod 250$_{A2}$ on node 215$_{A2}$ to be shut down and restarted. When the pod 250$_{A2}$ on node 215$_{A2}$ is shut down, it is restarted as pod 250$_{B2}$ on node 215$_{B2}$ on Site B Kubernetes cluster 205$_B$. This causes the compute resources associated with node 215$_{A2}$ to be moved from Site A Kubernetes cluster 205$_A$ to Site B Kubernetes cluster 205$_B$. Where there are more than two nodes, this process continues until all pods have been migrated from Site A Kubernetes cluster 205$_A$ to Site B Kubernetes cluster 205$_B$.

Figure 7:
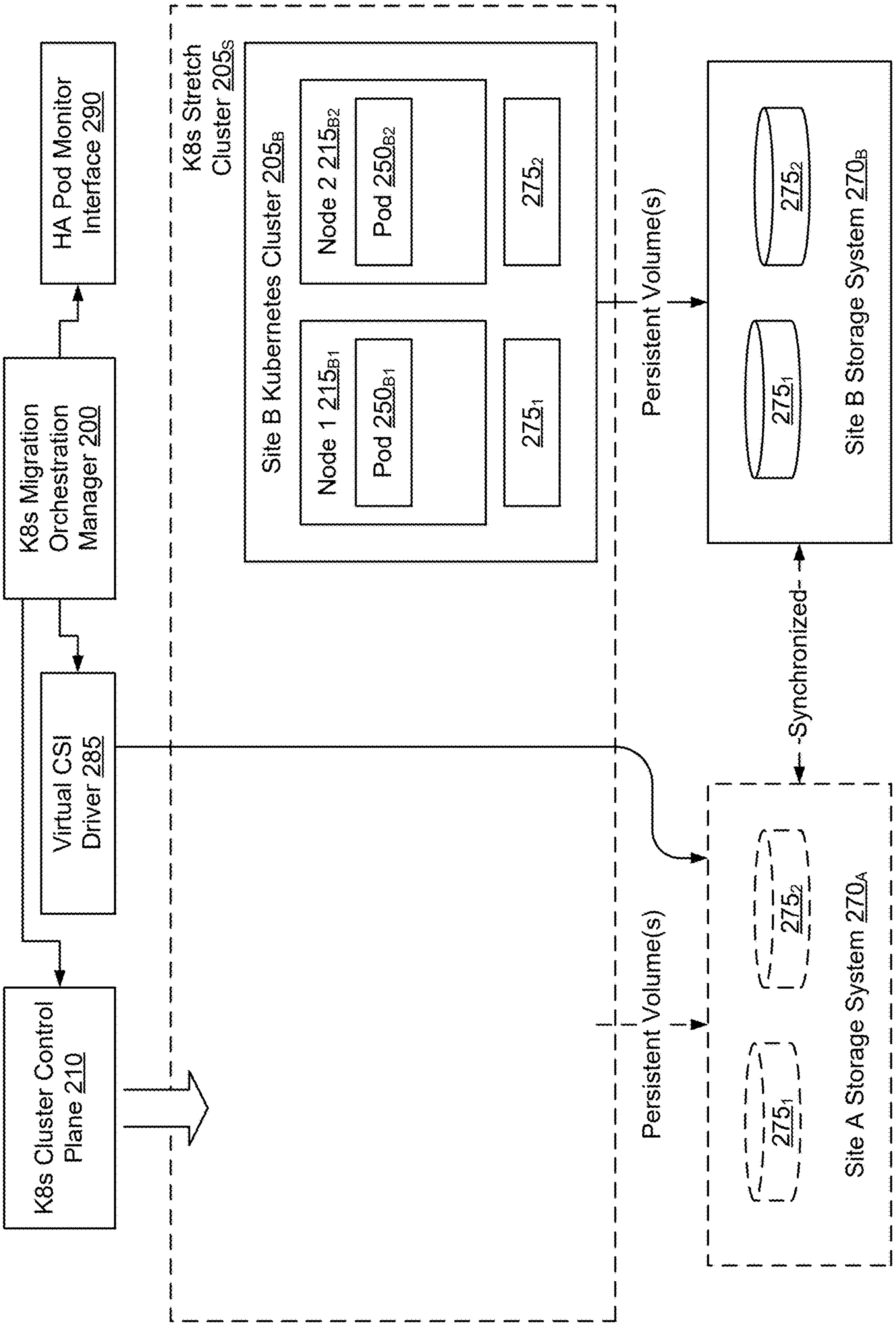
FIG. 7 is a block diagram of the example Kubernetes cluster of FIG. 3 during the Kubernetes migration process, graphically showing orchestration of removal of the compute and storage resources from Site A, according to some embodiments.
Figure 8:
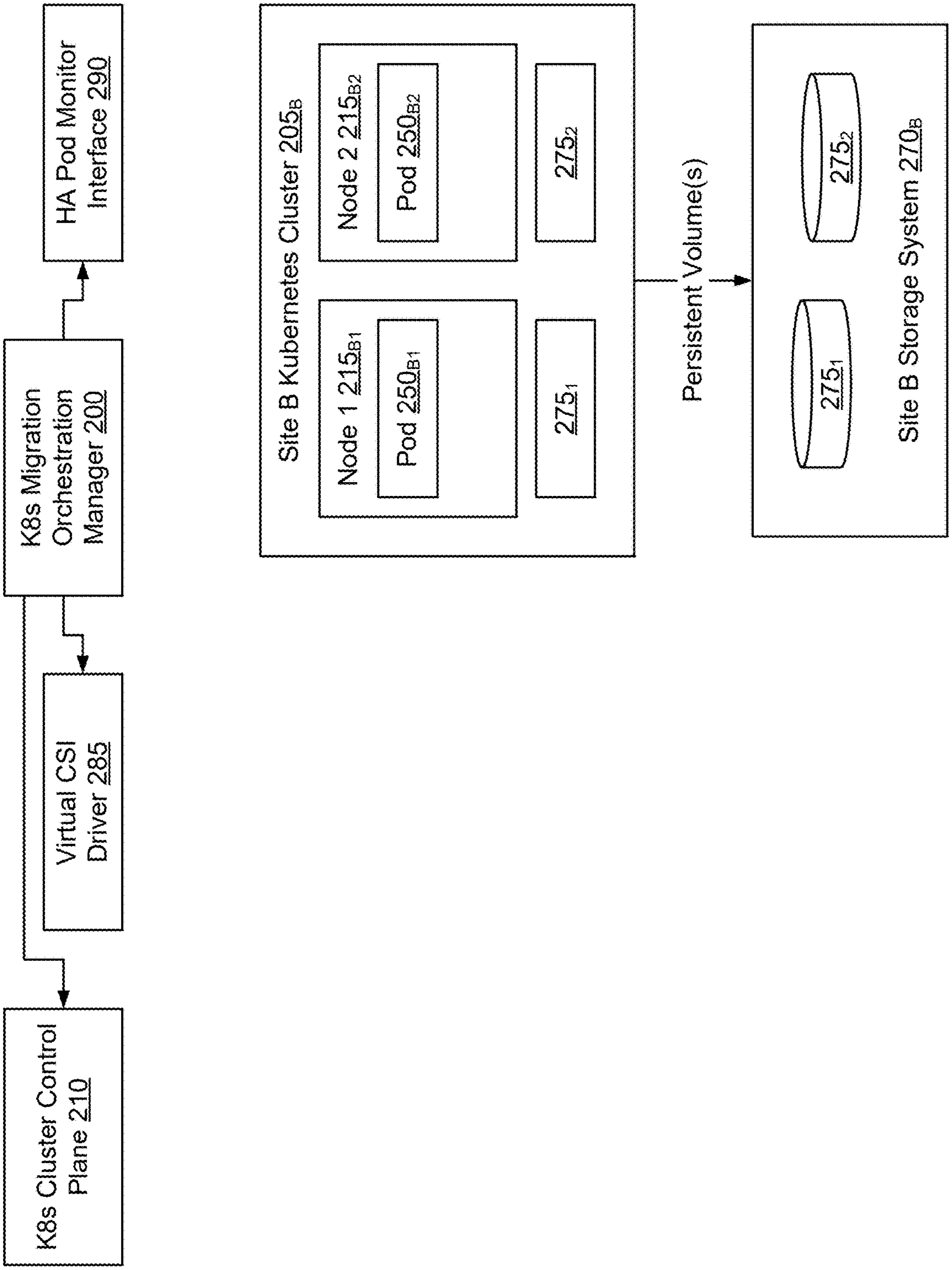
FIG. 8 is a block diagram of the example Kubernetes cluster of FIG. 3 including compute and storage resources at Site B after completion of the Kubernetes migration process, according to some embodiments.

FIG. 7 is a block diagram of the example Kubernetes cluster of FIG. 3 during the Kubernetes migration process, graphically showing orchestration of removal of the compute and storage resources from Site A, according to some embodiments. As shown in FIG. 7, once all the pods have been migrated to Site B, all of the nodes on Site A are shut down. FIG. 8 is a block diagram of the example Kubernetes cluster of FIG. 3 including compute and storage resources at Site B after completion of the Kubernetes migration process, according to some embodiments. As shown in FIG. 8, at this point it is possible to unstretch the Kubernetes cluster such that the Kubernetes cluster only includes Site B. Optionally, the synchronized relationship between the persistent volumes 275 on Site A storage system 270$_A$ and Site B storage system 270$_B$ may also be removed, although the synchronized relationship may be advantageously maintained, in particular instances, for example to provide backup to the persistent volumes 275 or to facilitate migration back to Site A, in the event that back migration is subsequently deemed to be advantageous.

Figure 9:
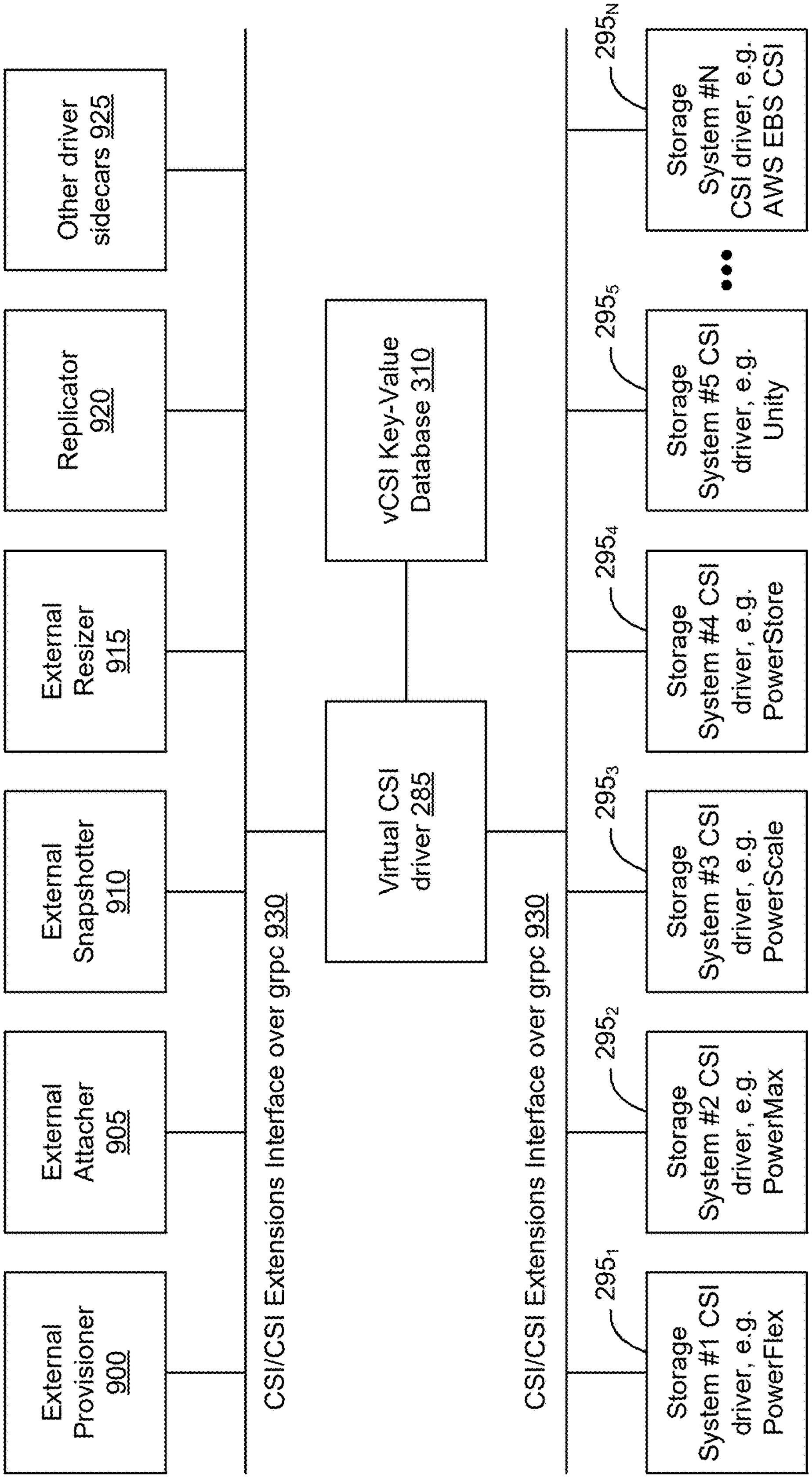
FIG. 9 is a block diagram of virtual CSI driver enabling creation of storage volumes on multiple types of underlying storage systems to facilitate Kubernetes cluster migration between heterogenous storage systems, according to some embodiments.

FIG. 9 is a block diagram of virtual CSI driver 285 enabling creation of storage volumes on multiple types of underlying storage systems to facilitate Kubernetes cluster migration between heterogenous storage systems, according to some embodiments. As shown in FIG. 9, in some embodiments the virtual CSI driver 285 is configured to receive input from a number of input sources shown on the top, and to provide output to a number of different types of storage systems, shown on the bottom. In FIG. 9 the input sources include an external provisioner 900 configured to provision storage, an external attacher 905 configured to attach storage, an external snapshotter 910 configured to create a snapshots of storage volumes, an external resizer 915 configured to implement resizing operations on provisioned storage, a replicator 920 configured to cause volumes of storage to be replicated between storage systems, and other driver sidecars 925. For example, in FIG. 9 the virtual CSI driver 285 is configured to receive instructions to provision storage on a particular storage system type from an external provisioner 900, and in response to interact with the identified storage system type to provision the requested storage.

The virtual CSI driver 285 in FIG. 9 is configured to interact with multiple storage system CSI drivers to enable the virtual CSI driver 285 to take actions on each of the storage systems of different types. In FIG. 9, several storage system types that are commercially available from Dell™ are shown. Specifically, in FIG. 9 the virtual CSI driver 285 is configured to interface with a first CSI driver for PowerFlex™ $\mathbf{295_1}$, a second CSI driver for PowerMax™ $\mathbf{295_2}$, a third CSI driver for PowerScale™ $\mathbf{295_3}$, a fourth CSI driver for PowerStore™ $\mathbf{295_4}$, and a fifth CSI driver for Unity™ $\mathbf{295_5}$. The virtual CSI driver 285 may be configured to interface with additional CSI drivers, such as other company's CSI drivers or CSI drivers configured to implement cloud storage $\mathbf{295_N}$. Although FIG. 9 shows a particular set of CSI drivers $\mathbf{295_1}$-$\mathbf{295_N}$, it should be understood that the particular selection of CSI drivers that the virtual CSI driver 285 is configured to interact with will depend on the particular implementation.

It should be noted that the different types of storage systems might have different naming constructs and use different commands for creating storage volumes, or for implementing actions on the storage volumes such as to attach the created volumes to particular directories, create snapshots, resize the storage volume, etc. In some embodiments, the external systems 900-925 communicate with the virtual CSI driver 285 using CSI/CSI extensions interfaces using a protocol such as GRPC (Google Remote Procedure Call) 930, and similarly the virtual CSI driver communicates with the storage system specific CSI drivers using the same type of protocol. GRPC is designed to connect microservices running across data centers. In some embodiments, the virtual CSI driver translates between commands received by from the external systems 900-925 and the drivers $\mathbf{295_1}$-$\mathbf{295_N}$, to provide the Kubernetes cluster with a common CSI interface to multiple types of storage systems. This enables the Kubernetes migration orchestration manager to automate Kubernetes cluster migration between heterogeneous storage system types, to enable a Kubernetes cluster to be seamlessly migrated from Site A to Site B regardless of the types of underlying storage systems that have been selected to implement the persistent volumes at Site A and at Site B.

In some embodiments, when a set of storage volumes 275 is created by the virtual CSI driver 285 on the Site B storage system $\mathbf{270_B}$, the Site B storage system $\mathbf{270_B}$ may have a different naming convention for storage volumes than is used on the Site A storage system $\mathbf{270_A}$. In some embodiments, the virtual CSI driver 285 maintains a virtual CSI key-value database 310 maintaining a correlation between the name of the storage volume created on the Site B storage system $\mathbf{270_B}$ for the persistent volumes and the name of the storage volume created on the Site B storage system $\mathbf{270_B}$ for the persistent volumes. By maintaining an abstraction of the underlying naming convention in the virtual CSI driver 285, it is possible to avoid reconfiguration of the persistent volumes when pods are restarted from a different storage end-point, even though the new storage end point might use an entirely different naming convention and have a different set of APIs.

FIGS. 10-12 are swim lane diagrams illustrating automated Kubernetes migration orchestration of a Kubernetes cluster from Site A to Site B, according to some embodiments. As shown in FIG. 10, when a user initiates Kubernetes migration, including both compute and storage (arrow 1), the Kubernetes migration orchestration manager 200 instructs the Site A storage system $\mathbf{270_A}$ to connect with the Site B storage system $\mathbf{270_B}$ (arrow 2). In response, the Site A storage system $\mathbf{270_A}$ connects to the Site B storage system $\mathbf{270_B}$ (arrow 3). The Site A storage system $\mathbf{270_A}$ then responds to the Kubernetes migration orchestration manager 200 that the storage systems have been connected (arrow 4).

The Kubernetes migration orchestration manager 200 then sends a request to the Kubernetes cluster control plane 210 for a list of persistent volumes 275 in use by the Site A Kubernetes cluster $\mathbf{205_A}$ (arrow 5). As noted above, in some embodiments the Kubernetes control plane 210 includes an etcd database 230 that maintains metadata describing the Kubernetes cluster, including a list of persistent volumes (e.g., the persistent volume objects and persistent volume claim objects). The Kubernetes cluster control plane 210 returns a list of persistent volumes (arrow 6).

The Kubernetes migration orchestration manager 200 then instructs the Site A storage system $\mathbf{270_A}$ to stretch the given set of volumes to the Site B storage system $\mathbf{270_B}$ (arrow 7). As used herein, the term "stretch" when applied to a "persistent volume", is defined as creating a corresponding persistent volume on Site B storage system $\mathbf{270_B}$ and synchronizing data between the persistent volume on Site A storage system $\mathbf{270_A}$ and the corresponding persistent volume on the Site B storage system $\mathbf{270_B}$. In some embodiments, the instruction to stretch the given set of persistent volumes is implemented by the Site A storage system $\mathbf{270_A}$ by creating a snapshot of each of the storage volumes (snapset), transmitting an instruction to the Site B storage system $\mathbf{270_B}$ to create corresponding volumes, and transmitting the snapset of the persistent volumes to the Site B storage system $\mathbf{270_B}$ (arrow 8).

Once the snapset has been received, the Site B storage system $\mathbf{270_B}$ reports success (arrow 9). Depending on the size of the persistent volumes and the speed of the communication network between the two storage systems, it may take a considerable amount of time to do the initial transfer. Accordingly, it may be necessary to transmit several snapsets to bring the storage systems into synchronization (arrows 8 and 9 might iterate more than once). For example, if the initial transmission of the snapset of persistent volumes takes two hours to transmit from the Site A storage system $\mathbf{270_A}$ to the Site B storage system $\mathbf{270_B}$, after the initial transmission is complete a subsequent snapset including only the changes that occurred in the previous two hours may be transmitted. Assuming that second snapset is significantly smaller than the first snapset, the second iteration of arrows 8 and 9 would be expected to take less time than the first iteration.

Once synchronized state has been achieved between the two storage systems $\mathbf{270_A}$, $\mathbf{270_B}$, the Site A storage system $\mathbf{270_A}$ reports back to the Kubernetes migration orchestration manager 200 that the persistent volumes have been stretched to the Site B storage system $\mathbf{270_B}$ (arrow 10) and that the persistent volumes have achieved a synchronized state between the two storage systems. By stretching the storage volumes to the Site B storage system $\mathbf{270_B}$ at Site B before moving compute resources of the Kubernetes cluster to the Site B Kubernetes cluster $\mathbf{205_B}$, it is possible to make the persistent volumes available on the Site B Kubernetes cluster $\mathbf{205_B}$ such that the persistent volumes are ready and available for Kubernetes nodes to use once the Kubernetes nodes are started at the Site B Kubernetes cluster $\mathbf{205_B}$.

As shown in FIG. 11, after the persistent volumes have been stretched to the Site B storage system $\mathbf{270_B}$, the Kubernetes migration orchestration manager 200 instructs the Kubernetes cluster control plane 210 to stretch the Kubernetes cluster to include the Site B Kubernetes cluster 205$_B$ (arrow 11). The Kubernetes cluster control plane 210 instructs Site A (arrow 12) to cause Site B to join the Kubernetes cluster (arrow 13). Once Site B has joined the cluster, Site B notifies Site A (arrow 14) and Site A notifies the control plane (arrow 15) that the Kubernetes cluster has been stretched.

The Kubernetes migration orchestration manager 200 then starts migrating compute resources of the Kubernetes cluster from Site A to Site B. In some embodiments, as discussed in greater detail herein, the Kubernetes migration orchestration manager 200 instructs the HA pod monitor 240 (arrow 16) to execute a gradual sequential pod movement operation (arrow 17) in which individual pods are shut down on Site A and restarted on the Site B. The pod monitor 240 selects a node, applies a taint to the node to cause the pods on the node to be shut down. Specifically, in response to determining that a pod is on a tainted node, the pod monitor will shut down the node and all pods on the node (arrow 18). The high availability features of the pod monitor will automatically cause the pod to be restarted on another node. Since there are available nodes on the Site B Kubernetes cluster 205$_B$, the pod monitor will cause the pod to be restarted on the Site B Kubernetes cluster 205$_B$ (arrow 19). The pod monitor will determine that the pod has been started on a node on the Site B Kubernetes cluster 205$_B$ (arrow 20) and that the pod was shut down on the Site A Kubernetes cluster 205$_A$ (arrow 21).

Where there are multiple pods on the Site A Kubernetes cluster 205$_A$ to be migrated, the process of selecting a pod to be moved, applying a taint to the node to cause the node and pod to be stopped on the node of Site A Kubernetes cluster 205$_A$, and then automatically starting a pod on the Site B Kubernetes cluster 205$_B$ may iterate to incrementally move pods one at a time (or in small groups) from the Site A Kubernetes cluster 205$_A$ to the Site B Kubernetes cluster 205$_B$. Causing a particular pod to be stopped before a new instance of the pod is started at the Site B Kubernetes cluster 205$_B$ can have a somewhat deleterious effect on application performance. By incrementally moving pods one at a time or in small groups, the overall impact on the application may be minimized. Using the built-in high availability features of the pod monitor 240 on the Site A Kubernetes cluster 205$_A$ to mark particular nodes as tainted, enables the compute resources of the Site A Kubernetes cluster 205$_A$ to be automatically moved from the Site A Kubernetes cluster 205$_A$ to the Site B Kubernetes cluster 205$_B$ without creating a new mechanism to specify where particular pods should execute. By implementing the migration of compute resources incrementally over time, it is possible to migrate the Kubernetes cluster without requiring the Kubernetes cluster to stop operation during the migration process and ensures that the user applications executing in the pods are minimally affected by the migration process.

As shown in FIG. 12, once the Kubernetes cluster has been stretched and the compute resources have been moved to the Site B Kubernetes cluster 205$_B$, the Site A Kubernetes cluster 205$_A$ is shut down and the Kubernetes stretch cluster is removed. In some embodiments, this is orchestrated by having the Kubernetes migration orchestration manager 200 send an instruction to the control plane of the Site B Kubernetes cluster 205$_B$ to unstretch the Kubernetes cluster (arrow 24). The control plane of the Site B Kubernetes cluster 205$_B$ sends an instruction to the control plane of the Site A Kubernetes cluster 205$_A$ to unstretch the Kubernetes cluster (arrow 25). The control plane of the Site A Kubernetes cluster 205$_A$ returns success (arrow 26) as does the control plane of the Site B Kubernetes cluster 205$_B$ (arrow 27).

When the Kubernetes migration orchestration manager 200 receives confirmation from the control plane of the Site B Kubernetes cluster 205$_B$ that the Kubernetes cluster has been unstretched (receipt of arrow 27), the Kubernetes migration orchestration manager 200 optionally instructs the Site B storage system 270$_B$ that the synchronization relationship between the Site A storage system 270$_A$ and the Site B storage system 270$_B$ is no longer required (arrow 28). In response to receipt of an instruction to remove the synchronous relationship between the storage systems 270$_A$, 270$_B$, the Site B storage system 270$_B$ sends an instruction to the Site A storage system 270$_A$ to remove the synchronized state (arrow 29). The Site A storage system 270$_A$ sends a message to the Site B storage system 270$_B$ that the synchronized state has been removed (arrow 30), and the Site B storage system 270$_B$ returns success to the Kubernetes migration orchestration manager 200 (arrow 31) indicating that the synchronized state has been removed.

The Kubernetes migration orchestration manager 200 then notifies the user 300 that the Kubernetes cluster, including both compute resources and storage resources, has been migrated. Since the migration was able to be completed without disrupting execution of the application contained in the containers of the pods, the Kubernetes migration is able to be implemented in a seamless way to the application end users.

Figure 13:
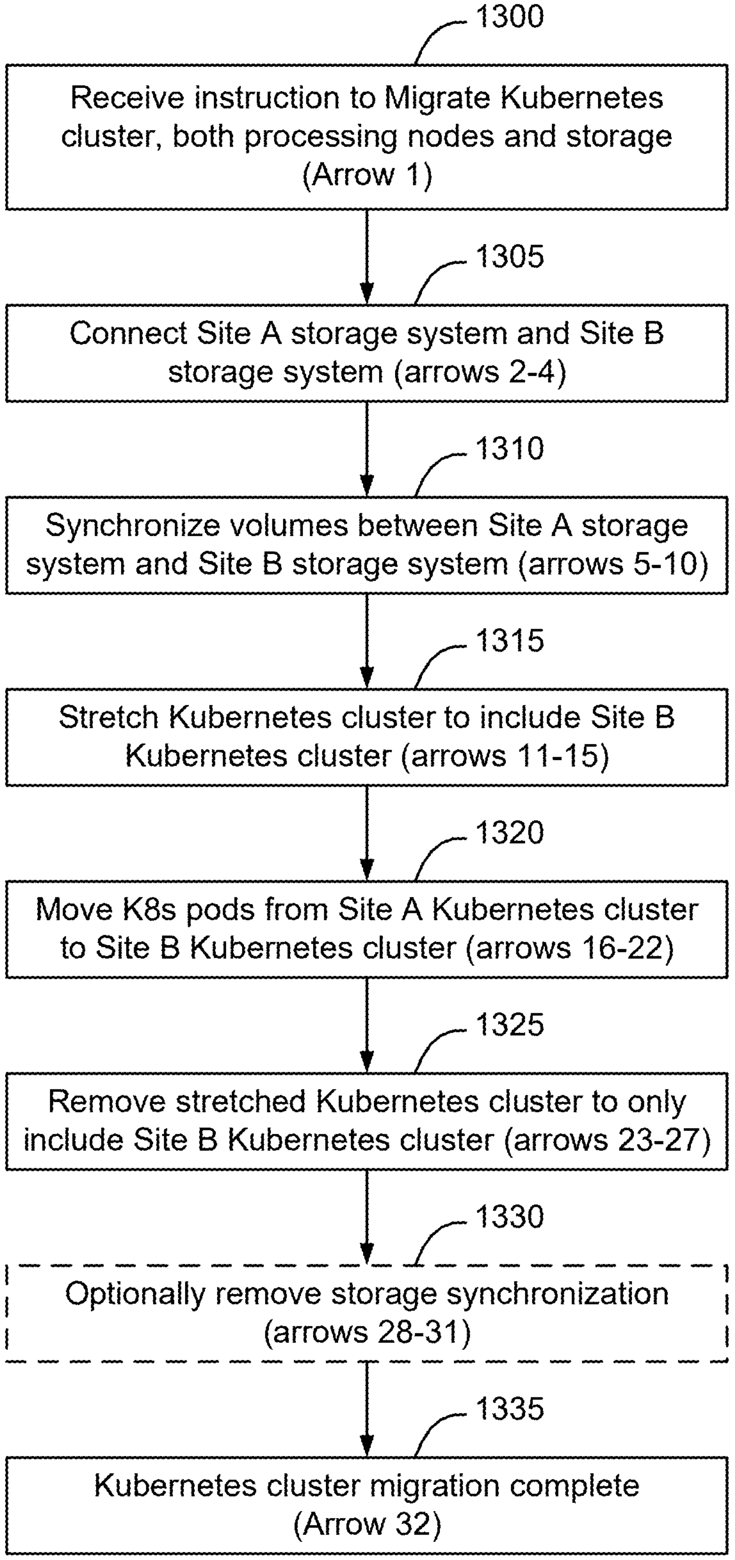
FIG. 13 is a flow chart of an example process of automated Kubernetes migration orchestration, according to some embodiments.

FIG. 13 is a flow chart of an example process of automated Kubernetes migration orchestration. As shown in FIG. 13, in some embodiments the Kubernetes migration orchestration manager 200 receives an instruction to migrate a Kubernetes cluster, including both processing and storage resources (block 1300). This is shown in arrow 1 of FIGS. 10-12. The Kubernetes migration orchestration manager 200 connects the Site A storage system 270$_A$ and Site B storage system 270$_B$ (block 1305). This is shown in arrows 2-4 of FIGS. 10-12. The persistent volumes 275 are then synchronized between the Site A storage system 270$_A$ and Site B storage system 270$_B$ (block 1310). This is shown in arrows 5-10 of FIGS. 10-12.

The Kubernetes cluster is then stretched to include Site B Kubernetes cluster 205$_B$ (block 1315). This is shown in arrows 11-15 of FIGS. 10-12. The Kubernetes pods are then moved from Site A Kubernetes cluster 205$_A$ to Site B Kubernetes cluster 205$_B$ (block 1320). This is shown in arrows 16-22 of FIGS. 10-12. The stretched Kubernetes cluster is then removed, to no longer include the Site A Kubernetes cluster 205$_A$ (block 1325). This is shown in arrows 23-27 of FIGS. 10-12. Optionally, the storage synchronization may be removed between the Site A storage system 270$_A$ and Site B storage system 270$_B$ (block 1330) This is shown in arrows 28-31 of FIGS. 10-12. The Kubernetes cluster has thus been moved, from Site A to Site B (block 1335), and optionally the user may be notified that the migration is complete (arrow 32 of FIGS. 10-12).

By leveraging the virtual CSI driver, which adds an abstraction layer for persistent volume identifiers, it is possible to ensure that the PODs can be restarted in Site B Kubernetes cluster and can access the persistent volumes from the Site B storage system in a seamless manner. This process avoids the otherwise required reconfiguration, when Persistent Volumes get migrated across heterogeneous storage systems.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of orchestrating migration of a Kubernetes cluster between heterogeneous storage systems, comprising:

determining, by a Kubernetes migration orchestration manager, a first set of persistent volumes used by the Kubernetes cluster at a first Kubernetes cluster site, the first set of persistent volumes being provided to the first Kubernetes cluster site by a first storage system;

stretching the first set of persistent volumes from the first storage system to a second set of persistent volumes on second storage system;

stretching the Kubernetes cluster to include both the first Kubernetes cluster site and a second Kubernetes cluster site, the second Kubernetes cluster site obtaining the second set of persistent volumes from the second storage system;

sequentially applying a taint to Kubernetes nodes by a high availability Kubernetes pod monitor on the first Kubernetes cluster site to cause Kubernetes pods to be sequentially shut down on the first Kubernetes cluster site and sequentially restarted on the second Kubernetes cluster site; and after all Kubernetes nodes have been tainted on the first Kubernetes cluster site, unstretching the Kubernetes cluster to only include the second Kubernetes cluster site.

2. The method of claim 1, wherein the first storage system and second storage system are heterogeneous.

3. The method of claim 2, wherein stretching the first set of persistent volumes from the first storage system to the second storage system comprises creating corresponding second set of persistent volumes on the second storage system, copying data from the first set of persistent volumes to the second set of persistent volumes, and achieving a synchronized state between the second set of persistent volumes and the first set of persistent volumes.

4. The method of claim 3, further comprising mapping, by a virtual Container Storage Interface (CSI) driver, second persistent volume identifiers of the second set of persistent volumes to first persistent volume identifiers of the first set of persistent volumes.

5. The method of claim 4, further comprising accessing the first set of persistent volumes by the pods on the first Kubernetes cluster site by using the first persistent volume identifiers, and accessing the second set of persistent volumes by the pods on the second Kubernetes cluster by using the same first persistent volume identifiers and the virtual CSI driver mapping to provide continued access to the persistent volumes without reconfiguring the pods to directly address the second set of persistent volumes.

6. The method of claim 4, wherein the CSI driver contains a CSI driver to interface with multiple types of heterogeneous storage systems.

7. The method of claim 1, wherein the persistent volumes include persistent volume objects and persistent volume claim objects.

8. The method of claim 1, further comprising unstretching the first set of persistent volumes by removing the synchronized state between the second set of persistent volumes and the first set of persistent volumes.

9. The method of claim 1, wherein sequentially applying the taint to Kubernetes nodes by the high availability Kubernetes pod monitor on the first Kubernetes cluster site to cause the Kubernetes pods to be sequentially shut down on the first Kubernetes cluster site and sequentially restarted on the second Kubernetes cluster site comprises:

selecting a given Kubernetes pod on the first Kubernetes cluster site;

stopping the given Kubernetes pod on the first Kubernetes cluster site; and starting a corresponding Kubernetes pod on the second Kubernetes cluster site before selecting a subsequent node containing a subsequent Kubernetes pod to be tainted.

10. The method of claim 9, wherein the Kubernetes pods are implementing multiple instances of an executing user application, and wherein causing the Kubernetes pods to be sequentially shut down on the first Kubernetes cluster site and sequentially restarted on the second Kubernetes cluster site enables continued access to the executing user application.

11. A system for orchestrating migration of a Kubernetes cluster between heterogeneous storage systems, comprising:

one or more processors and one or more storage devices storing instructions that are operable, when executed by the one or more processors, to cause the one or more processors to perform operations comprising:

determining, by a Kubernetes migration orchestration manager, a first set of persistent volumes used by the Kubernetes cluster at a first Kubernetes cluster site, the first set of persistent volumes being provided to the first Kubernetes cluster site by a first storage system;

stretching the first set of persistent volumes from the first storage system to a second set of persistent volumes on second storage system;

stretching the Kubernetes cluster to include both the first Kubernetes cluster site and a second Kubernetes cluster site, the second Kubernetes cluster site obtaining the second set of persistent volumes from the second storage system;

sequentially applying a taint to Kubernetes nodes by a high availability Kubernetes pod monitor on the first Kubernetes cluster site to cause Kubernetes pods to be sequentially shut down on the first Kubernetes cluster site and sequentially restarted on the second Kubernetes cluster site; and after all Kubernetes nodes have been tainted on the first Kubernetes cluster site, unstretching the Kubernetes cluster to only include the second Kubernetes cluster site.

12. The system of claim 11, wherein the first storage system and second storage system are heterogeneous.

13. The system of claim 12, wherein stretching the first set of persistent volumes from the first storage system to the second storage system comprises creating corresponding second set of persistent volumes on the second storage system, copying data from the first set of persistent volumes to the second set of persistent volumes, and achieving a synchronized state between the second set of persistent volumes and the first set of persistent volumes.

14. The system of claim 13, further comprising mapping, by a virtual Container Storage Interface (CSI) driver, second persistent volume identifiers of the second set of persistent volumes to first persistent volume identifiers of the first set of persistent volumes.

15. The system of claim 14, further comprising accessing the first set of persistent volumes by the pods on the first Kubernetes cluster site by using the first persistent volume identifiers, and accessing the second set of persistent volumes by the pods on the second Kubernetes cluster by using the same first persistent volume identifiers and the virtual CSI driver mapping to provide continued access to the persistent volumes without reconfiguring the pods to directly address the second set of persistent volumes.

16. The system of claim 14, wherein the CSI driver contains a CSI driver to interface with multiple types of heterogeneous storage systems.

17. The system of claim 11, wherein the persistent volumes include persistent volume objects and persistent volume claim objects.

18. The system of claim 11, further comprising unstretching the first set of persistent volumes by removing the synchronized state between the second set of persistent volumes and the first set of persistent volumes.

19. The system of claim 11, wherein sequentially applying the taint to Kubernetes nodes by the high availability Kubernetes pod monitor on the first Kubernetes cluster site to cause the Kubernetes pods to be sequentially shut down on the first Kubernetes cluster site and sequentially restarted on the second Kubernetes cluster site comprises:

selecting a given Kubernetes pod on the first Kubernetes cluster site;

stopping the given Kubernetes pod on the first Kubernetes cluster site; and starting a corresponding Kubernetes pod on the second Kubernetes cluster site before selecting a subsequent node containing a subsequent Kubernetes pod to be tainted.

20. The system of claim 19, wherein the Kubernetes pods are implementing multiple instances of an executing user application, and wherein causing the Kubernetes pods to be sequentially shut down on the first Kubernetes cluster site and sequentially restarted on the second Kubernetes cluster site enables continued access to the executing user application.

* * * * *